(12) United States Patent
Fairgrieve et al.

(10) Patent No.: US 9,586,595 B2
(45) Date of Patent: Mar. 7, 2017

(54) VEHICLE CONTROL SYSTEM AND METHOD

(71) Applicant: Jaguar Land Rover Limited, Whitley Coventry Warwickshire (GB)

(72) Inventors: Andrew Fairgrieve, Rugby (GB); Elliot Hemes, Solihull (GB); James Kelly, Solihull (GB); Dan Dennehy, Coventry (GB); Sam Anker, Coventry (GB)

(73) Assignee: Jaguar Land Rover Limited, Whitely, Coventry, Warwickshire (GB)

( * ) Notice: Subject to any disclaimer, the term of this patent is extended or adjusted under 35 U.S.C. 154(b) by 0 days.

(21) Appl. No.: 14/425,031

(22) PCT Filed: Sep. 3, 2013

(86) PCT No.: PCT/EP2013/068139
§ 371 (c)(1),
(2) Date: Feb. 28, 2015

(87) PCT Pub. No.: WO2014/037325
PCT Pub. Date: Mar. 13, 2014

(65) Prior Publication Data
US 2015/0203124 A1  Jul. 23, 2015

(30) Foreign Application Priority Data

Sep. 6, 2012 (GB) .................. 1215954.7

(51) Int. Cl.
*B60W 50/08* (2012.01)
*B60K 37/06* (2006.01)
(Continued)

(52) U.S. Cl.
CPC ............. *B60W 50/08* (2013.01); *B60K 35/00* (2013.01); *B60K 37/06* (2013.01);
(Continued)

(58) Field of Classification Search
CPC ............ G01C 21/3644; G01C 21/3492; G01C 21/367; G01C 21/3673; G01C 21/3676; G06Q 30/0259
(Continued)

(56) References Cited

U.S. PATENT DOCUMENTS 7,248,956 B2 * 7/2007 Erban ................... B60T 8/1755
701/48
7,577,508 B2 * 8/2009 Fitzgibbons ....... B60G 17/0195
701/70
(Continued)

FOREIGN PATENT DOCUMENTS

DE       10253809 A1    5/2004
DE     102004054264 A1  5/2006
(Continued)

OTHER PUBLICATIONS

William Strunk Jr. and E.B. White, The Elements of Style, 3rd Ed., 1979, all pages.*
(Continued)

*Primary Examiner* — Calvin Cheung
(74) *Attorney, Agent, or Firm* — Reising Ethington P.C.

(57) ABSTRACT

Embodiments of the present invention provide a motor vehicle control system for selecting a driving surface and for controlling a plurality of vehicle subsystems to operate in a plurality of subsystem configuration modes in dependence on the selected driving surface, the system being operable in a manual operating mode in which a user is able to select said driving surface and an automatic operating mode in which the system is operable to select said driving surface automatically; wherein the system is able to be switched between said manual and automatic operating modes by means of a user-operable input device; and wherein when operating in the automatic operating mode and a change from the automatic operating mode to the manual operating
(Continued)

mode is made via the user-operable input device, the system is configured to select a default subsystem configuration mode.

20 Claims, 4 Drawing Sheets

(51) Int. Cl.
    *B60K 35/00*     (2006.01)
    *B60W 50/00*     (2006.01)

(52) U.S. Cl.
    CPC ........ *B60W 50/082* (2013.01); *B60W 50/085* (2013.01); *B60K 2350/1036* (2013.01); *B60W 2050/0066* (2013.01); *B60W 2050/0096* (2013.01); *B60W 2550/14* (2013.01)

(58) Field of Classification Search
    USPC .......................................................... 701/23
    See application file for complete search history.

(56) References Cited

U.S. PATENT DOCUMENTS

| | | | | |
|---|---|---|---|---|
| 7,933,699 | B2* | 4/2011 | Hara .................. | B60R 16/0231 340/438 |
| 8,145,402 | B2* | 3/2012 | Craig .................... | B60W 30/00 701/80 |
| 8,244,442 | B2* | 8/2012 | Craig .................... | B60T 8/1708 701/48 |
| 8,447,460 | B2* | 5/2013 | Nihei ................. | B60K 23/0808 701/29.2 |
| 8,452,504 | B2* | 5/2013 | Dickinson ............... | F16H 48/32 180/65.28 |
| 9,193,343 | B2* | 11/2015 | Jung ..................... | B60T 13/662 |
| 2003/0200016 | A1* | 10/2003 | Spillane ............. | B60G 17/0195 701/36 |
| 2004/0181322 | A1* | 9/2004 | Okuyama .............. | B63H 25/04 701/21 |
| 2005/0004723 | A1* | 1/2005 | Duggan ............... | G05D 1/0061 701/24 |
| 2005/0004732 | A1* | 1/2005 | Berry .................... | B60W 10/06 701/48 |
| 2007/0198145 | A1* | 8/2007 | Norris .................. | G05D 1/0246 701/23 |
| 2008/0027599 | A1* | 1/2008 | Logan .................. | G05D 1/0234 701/23 |
| 2010/0049408 | A1* | 2/2010 | Abadie ................. | B60T 8/1706 701/48 |
| 2016/0280234 | A1* | 9/2016 | Reilhac .................. | B60K 35/00 |

FOREIGN PATENT DOCUMENTS

| | | | | |
|---|---|---|---|---|
| EP | 1355209 | A1 | 10/2003 | |
| EP | 2075171 | A1 | 7/2009 | |
| GB | 2486578 | A | 6/2012 | |
| GB | 2492953 | A * | 1/2013 | ............ B60W 30/18 |
| JP | H10103496 | A | 4/1998 | |
| JP | 2002173011 | A | 6/2002 | |
| JP | 2004017951 | A | 1/2004 | |
| JP | 2007315438 | A | 12/2007 | |
| WO | 9727388 | A1 | 7/1997 | |

OTHER PUBLICATIONS

International Search Report for application No. PCT/EP2013/068139, dated Dec. 20, 2013, 5 pages.
UK Combined Search and Examination Report for corresponding application No. 12159541, dated Dec. 11, 2012, 7 pages.
Written Opinion for application No. PCT/EP2013/068139, dated Dec. 20, 2013, 7 pages.
Notice of Reasons for Refusal, in Japanese with English summary, corresponding to JP application No. 2015-530361, dated Mar. 29, 2016, 6 pages.
Japanese Office Action in Japanese with English summary for JP application No. 2015-530361, dated Aug. 23, 2016, 7 pages.

* cited by examiner

VEHICLE CONTROL SYSTEM AND METHOD

FIELD OF THE INVENTION

The present invention relates to a vehicle control system for one or more vehicle subsystems and to a method of controlling one or more vehicle subsystems.

BACKGROUND

It is known to provide a vehicle having a plurality of subsystems which can be operated in different configurations to suit different driving conditions. For example, automatic transmissions may be controlled in a variety of modes such as sport, manual, winter or economy. In each mode, subsystem control parameters such as accelerator pedal response and conditions under which changes between gear ratios take place may be modified so as to suit the conditions of the terrain or the particular taste of the driver. It is also known to provide air suspensions with on-road and off-road modes. Stability control systems can be operated at reduced activity in certain modes so as to give the driver more direct control, and power steering systems can be operated in different modes to provide a varying level of assistance depending an driving conditions.

It is desirable provide an improved control system for a motor vehicle operable in different configurations.

SUMMARY OF THE INVENTION

Embodiments of the invention may be understood with reference to the appended claims.

Aspects of the present invention provide as control system, a device, a vehicle and a method.

In one aspect of the invention for which protection is sought there is provided a motor vehicle control system for for controlling a plurality of vehicle subsystems to operate in plurality of subsystem configuration modes in dependence on a selected/determined driving surface, the system being operable in a manual operating mode in which a user is able to select said driving surface and an automatic operating mode in which the system is operable to select/determine said driving surface automatically;

wherein the system is able to be switched between said manual and automatic operating modes by means of a user-operable input device; and wherein when operating in the automatic operating mode and a change from the automatic operating mode to the manual operating mode is made via the user-operable input device, the system is configured to select a default driving surface and/or a default subsystem configuration mode.

Advantageously the default driving surface and/or default subsystem configuration mode may comprise one or more of:

a) the driving surface/subsystem configuration mode that was selected when the system was last in the manual operating mode, for example immediately prior to selection of the automatic operating mode; and b) a general purpose (e.g. road) driving surface/subsystem configuration mode.

The default driving surface and/or subsystem configuration mode may be independent of:

a) the subsystem configuration mode that was selected in the automatic mode;

b) the subsystem configuration mode that was selected when the system was last in the manual operating mode, i.e. immediately prior to selection of the automatic operating mode; and/or c) the position of the user-operable input device when the system was last in the manual operating mode, for example immediately prior to selection of the automatic operating mode.

In another aspect of the invention for which protection is sought there is provided a control device for a vehicle control system, the control system being arranged to control a plurality of vehicle subsystems to operate in a plurality of subsystem configuration modes in dependence on a selected driving surface, the system being operable in a manual operating mode in which a user is able to select said driving surface and an automatic operating mode in which the system is operable to select said driving surface automatically;

wherein the control system comprises a user operable input device configured to be displaced between a manual operating mode position in which the device can be manipulated by the user to select said driving surface and an automatic operating mode position in which the user is prevented from manipulating the device.

It to be understood that manipulation of the device to select said driving surface may be by rotation although other types of manipulation are also useful.

Advantageously the user operable input device may be configured to be displaced axially between the manual operating mode position and the automatic operating mode position.

Optionally, when in the automatic operating mode position, the user operable input device is partially or fully recessed into a trim panel or housing at least partially surrounding the Advantageously, when in the automatic operating mode position, pressing the user operable input device may cause the device to move axially to the manual operating mode position in which the device protrudes from the trim panel or housing.

In a further aspect of the invention for which protection is sought there is provided a control device for a vehicle control system, the control system being arranged to to control a plurality of vehicle subsystems to operate in a plurality of subsystem configuration modes in dependence on a selected/determined driving surface, the system being operable in a manual operating mode in which a user is able to select said driving surface and an automatic operating mode in which the system is operable to select said driving surface automatically; wherein the control system comprises a user operable input device configured to be rotated by the user in the manual operating mode thereby to select said driving surface and to be displaced axially by the user to switch between the manual operating mode and the automatic operating mode.

Optionally, in the manual operating mode of the system, clockwise rotation of the user operable input device causes sequential selection of said driving surface in a first order and anticlockwise rotation of the user operable input device causes sequential selection of said driving surface in the reverse direction order.

Optionally, in the manual operating mode of the system, when the user operable input device has been rotated in a first direction so as to select the last driving surface in the sequence further rotation of the device in said first direction maintains the selected driving surface and does not cause selection of the different driving surface.

Optionally, following selection of the automatic operating mode from the manual operating mode, subsequent selection of the manual operating mode causes selection of a default subsystem configuration mode that is independent of the rotational position of the user operable input device and/or independent of the previously selected subsystem configuration mode.

Optionally, in the manual operating mode, a mechanical stop is provided preventing rotation of the device past the last driving surface in the sequence. In such embodiments automatic manipulation of the device to a position corresponding to the default subsystem configuration mode may take place when switching automatic operating mode to manual operating mode.

In one aspect of the invention for which protection is sought there is provided a control system for a motor vehicle, the system being operable in a manual operating mode selection condition in which a user may select a required system operating mode by means of user-operable mode selection input means, and an automatic mode selection condition in which the system is operable to select automatically an appropriate system operating mode, the system being operable to allow a use to select the required operating condition by means of a user operable condition selection input means, wherein when operating in the automatic condition and a change from the automatic condition to the manual condition is made the system is operable to assume a prescribed operating mode when the manual condition is assumed, wherein the prescribed operating mode is selected independently of the identity of the operating mode in which the system operated when the system was last in the manual condition.

Thus the control system is arranged to ignore the mode that was selected when last in the manual condition and to assume the prescribed mode when a change from the automatic to the manual condition is made. This feature has the advantage that because the system assumes only the prescribed mode, a risk that an inappropriate mode is selected when the system resumes operation in the manual condition is reduced.

It is to be understood that the mode selected when the system was previously manual condition may no longer be appropriate when the system resumes the manual condition after being placed in the automatic condition. If when the manual condition is resumed the vehicle system assumed the mode the system was in when previously in the manual mode, a user may be inconvenienced since they may have forgotten the identity of that mode and/or may not be expecting that mode to be assumed. Accordingly, by ensuring that the system assumes a prescribed mode regardless of the previously selected manual mode, a risk of user inconvenience is reduced.

Embodiments of the present invention are useful in a range of motor vehicle system applications including but not limited to selection of different driving modes of operation of the vehicle. Co-pending UK patent application numbers GB1111288.5, GB1211910.3 and GB1202427.9 describe a vehicle control system operable to control a plurality of vehicle subsystems to operate in a prescribed subsystem control mode corresponding to a particular driving mode. Embodiments of the present invention are ideally suited to applications including the vehicle system described in those applications The system may be operable wherein the prescribed mode is a predetermined default mode that is selected regardless of the mode of operation of the system when the system was in the automatic condition.

In the case of a vehicle system for controlling a vehicle driving mode the default mode may be a mode suitable for use in on-road vehicle operating conditions and with which a user is likely to be most familiar. By assuming a familiar mode when exiting the automatic condition, user confidence in and enjoyment of the vehicle may be enhanced.

Alternatively the system may be operable wherein the prescribed mode is the same mode as that in which the system was operating when in the automatic condition immediately prior to assuming the manual condition.

Thus in some embodiments when the manual condition is assumed the system may be configured to remain in the operating mode in which it has been operating whilst in the automatic condition. This feature has the advantage that if whilst the system is in the automatic condition a user determines that they wish to remain in the present mode but are concerned that the system may automatically assume a different mode if the system remains in the automatic condition, the user may control the system to exit the automatic condition and assume the manual condition.

Optionally the user-operable mode selection input means comprises a rotary knob rotatable by a user to select a required system operating mode, when in the manual condition the system being operable to provide an indication to a user of the currently assumed system mode of operation.

The indication provided to the use may be a visual indication by means of a visual indicator.

The user operable condition selection input means may comprise switch means actuated by pressing the mode selection input means, optionally the rotary knob, to switch between automatic and manual conditions of the system.

This feature has the advantage that a risk that a user inadvertently activates or de-activates selection of the automatic condition is reduced. That is, when in the manual condition the system is operable to allow manual selection of a required operating mode by rotation of the rotary knob, whereas toggling between manual and automatic conditions is performed by pressing the mode selection input means, optionally pressing the rotary knob of the input means, rather than by rotating the knob.

If in contrast selection of automatic mode was made by rotation of the rotary knob, a risk exists that when rotating the knob to select manually a required operating mode, a user may select the automatic condition of operation accidentally. The user may thereby be inconvenienced since the operating mode assumed automatically by the system may be different from that which the driver considers appropriate at that moment in time.

Advantageously the switch means may be actuated by pressing the rotary knob in a substantially axial direction.

Advantageously the rotary knob may be arranged to assume a retracted position when the system is in the automatic condition and an exposed position when the system is in the manual condition.

This feature has the advantage that a user is less likely to become confused as to whether the system is in the automatic or manual condition. The user may determine in which condition the system is operating by feel, to determine whether the knob is in the exposed or retracted condition, without having to take their eyes off the terrain ahead and check the condition of the control.

Advantageously the rotary knob may be arranged not to be rotatable by a user when in the retracted condition.

That is, the rotary knob cannot be grasped and rotated by the user when the knob is in the retracted condition. This feature has the advantage that if the system is in the automatic condition and the user wishes to change the selected mode, if the used forgets the system is in the automatic condition and tries to rotate the knob, the user be reminded that the system is in the automatic condition since they be unable to grasp the knob. The user will then realise that they must first control the system to assume the manual condition, before being able to change manually the selected system operating mode.

Advantageously the operating modes are control modes of at least one vehicle subsystem of a vehicle, the system comprising a subsystem controller for initiating control of the or each of the vehicle subsystems in the selected one of the plurality of subsystem control modes, each of which corresponds to one or more different driving conditions for the vehicle, the system comprising evaluation means for evaluating one or more driving condition indicators to determine the extent to which each of the subsystem control modes is appropriate, wherein when in the automatic condition the system is operable automatically to control the subsystem controller to initiate control of the or each subsystem in the subsystem control mode which is most appropriate.

In a further aspect of the invention for which protection is sought there is provided a method of comprising a system according to the preceding aspect.

The vehicle may advantageously be adapted for off-road driving.

In one aspect of the invention for which protection is sought there is provided a method of controlling a vehicle system to operate in a manual operating mode selection condition or an automatic mode selection condition implemented by computing means, in the manual operating mode selection condition the method comprising receiving by computing means an input from a user-operable mode selection input means, the input corresponding to a required system operating mode, the method comprising controlling the system to assume the required mode, in the automatic operating mode selection condition the method comprising selecting automatically by computing means an appropriate system operating mode, the method further comprising receiving by the computing means an input corresponding to a required operating condition by means of a user operable condition selection input means, whereby when the system is operating in the automatic condition and a change from the automatic condition to the manual condition is made, the method comprises controlling the system to assume the manual condition and selecting a prescribed operating mode when the manual condition is assumed, whereby the method comprises selecting the prescribed operating mode independently of the identity of the operating mode in Which the system operated when the system was last in the manual condition Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

For the avoidance of doubt, it is to be understood that features described with respect to one aspect of the invention may be included within any other aspect of the invention alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION

Figure 1:
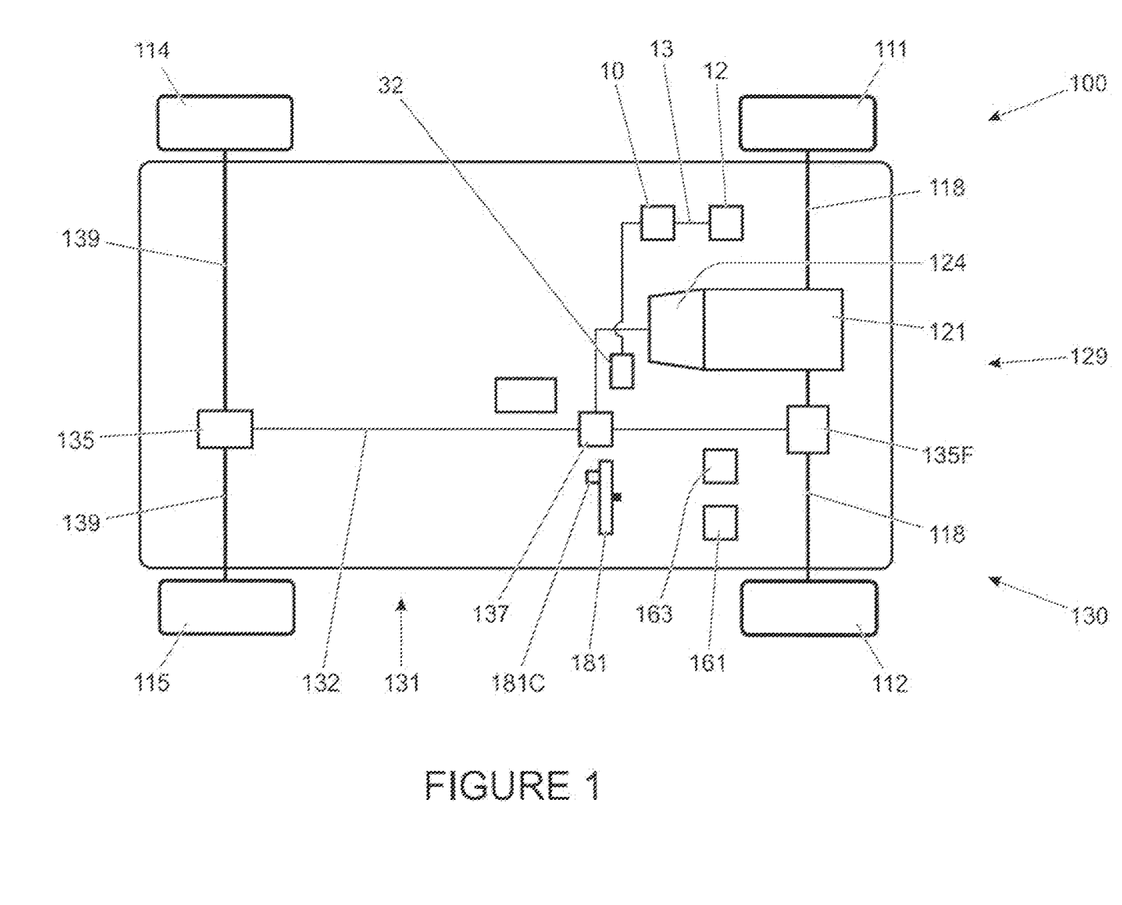
FIG. 1 is a schematic illustration of a vehicle according to an embodiment of the present invention.

FIG. 1 shows a vehicle 100 according to an embodiment of the invention intended to suitable for off-road use, that is for use on terrains other than regular tarmac road. The vehicle 100 has a powertrain 129 that includes an engine 121 that is connected to a driveline 130 having a transmission 124. In the embodiment shown the transmission 124 is an automatic transmission 124. Embodiments of the present invention are also suitable for use in vehicles with a manual transmission, continuously variable transmission or any other suitable transmission.

The driveline 130 is arranged to drive a pair of front vehicle wheels 111,112 by means of a front differential 135F and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable 10 the auxiliary driveline portion 131 by means of a power transfer unit (PTU) 137, allowing selectable two wheel drive or four wheel drive operation. It is to be understood that embodiments of the invention may be suitable for vehicles having more than four wheels or where only two wheels are driven, for example two wheels of a three wheeled vehicle or tour wheeled vehicle or a vehicle with more than four wheels.

The PTU 137 is operable in a 'high ratio' or a 'low ratio' configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions and other low speed applications such as towing.

The vehicle 100 has an accelerator pedal 161, brake pedal 163 and steering wheel 181. The steering wheel 181 has a cruise control selector button 181C mounted thereto.

The vehicle 160 has a central controller, referred to as a vehicle control unit (VCU) 10. The VCU 10 receives and outputs a plurality of signals to and from various sensors and subsystems 12 provided on the vehicle 100.

Figure 2:
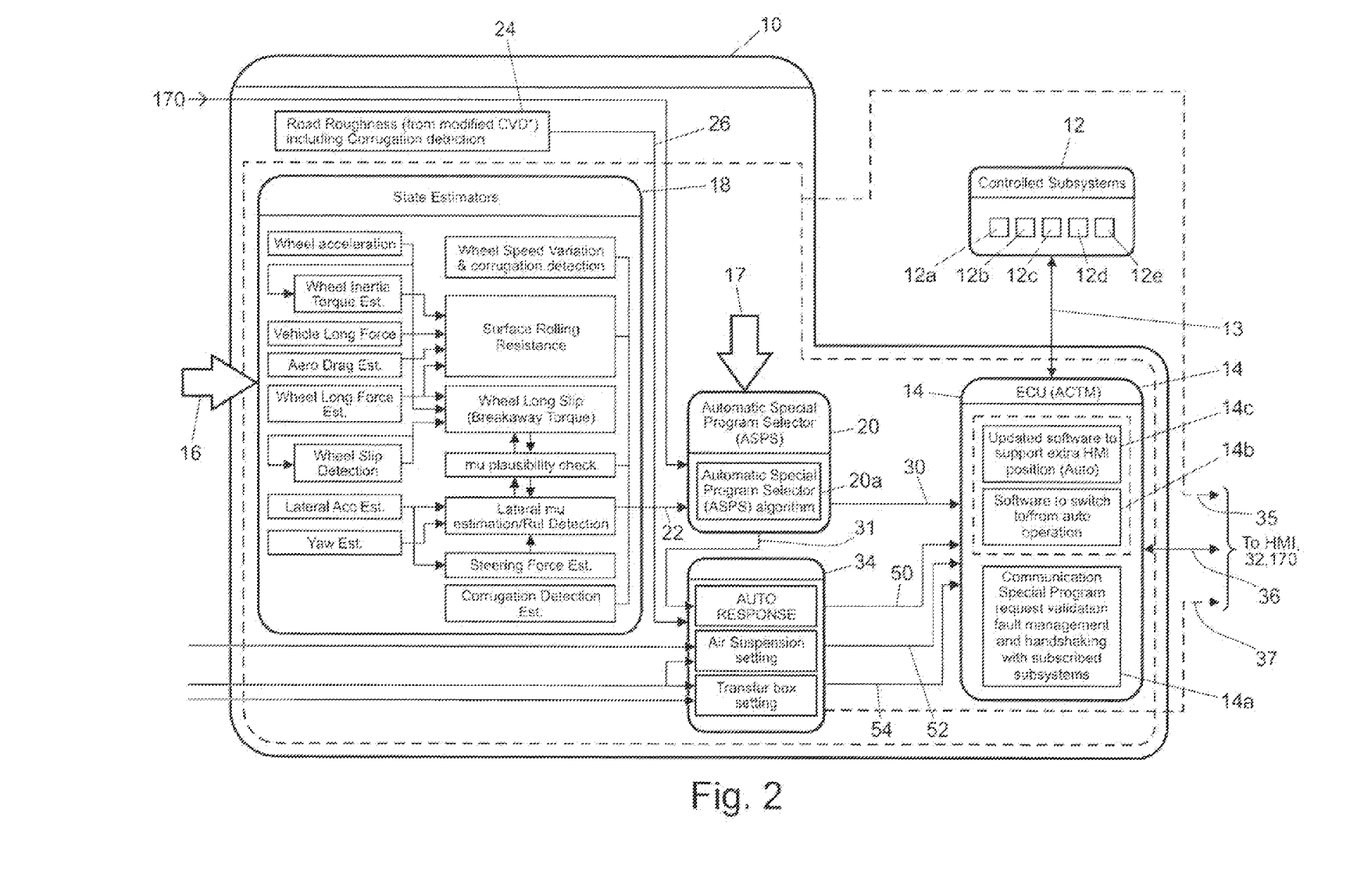
FIG. 2 is a block diagram to illustrate a vehicle control system in accordance with an embodiment of the invention, including various vehicle subsystems under the control of the vehicle control system.

FIG. 2 shows the ICU 10 in more detail. The VCU 10 controls a plurality of vehicle subsystems 12 including, but not limited to, an engine management system 12a, a transmission system 12b, an electronic power assisted steering unit 12c (eFAS unit), a brakes system 12d and a suspension system 12e. Although five subsystems are illustrated as being under the control of the VCU 10, practice a greater number of vehicle subsystems may be included on the vehicle and may be under the control of the VCU 10. The VCU 10 includes a subsystem control module 14 which provides control signals via line 13 to each of the vehicle subsystems 12 to initiate control of the subsystems in a manner appropriate to the driving condition, such as the terrain, in which the vehicle is travelling (referred to as the terrain condition). The subsystems 12 also communicate with the subsystems control module 14 via signal line 13 to feedback information on subsystem status.

The VCU 10 receives a plurality of signals, represented generally at 16 and 17, which are received from a plurality of vehicle sensors and are representative of a variety of different parameters associated with vehicle motion and status. As described in further detail below, the signals 16, 17 provide, or are used to calculate, a plurality of driving condition indicators (also referred to as terrain indicators) which are indicative of the nature of the condition which the vehicle is travelling. One advantageous feature of the invention is that the VCU 10 determines the most appropriate control mode for the various subsystems on the basis of the terrain indicators, and automatically controls the subsystems accordingly.

The sensors (not shown) on the vehicle include, but are not limited to, sensors which provide continuous sensor outputs 16 to the VCU 10, including wheel speed sensors, an ambient temperature sensor, an atmospheric pressure sensor, tyre pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an acceleration pedal position sensor and longitudinal, lateral, vertical motion sensors.

In other embodiments, only a selection of the aforementioned sensors may be used. The VCU 10 also receives a signal from the electronic power assisted steering unit (ePAS unit 12c) of the vehicle to indicate the steering force that is applied to the wheels (steering force applied by the driver combined with steering force applied by the ePAS unit 12c).

The vehicle 100 is also provided with a plurality of sensors which provide discrete sensor output signals 17 to the VCU 10, including a cruise control status signal (ON/OFF), a transfer box or PTU 137 status signal (whether the gear ratio is set to a HI range or a LO range), a Hill Descent Control (HCC) status signal (ON/OFF), a trailer connect status signal (ON/OFF), a signal to indicate that the Stability Control System (SCS) has been activated (ON/OFF), a windscreen wiper signal (ON/OFF), an air suspension ride-height status signal (HI/LO), and a Dynamic Stability Control (DSC) signal (ON/OFF).

The VCU 10 includes an evaluation means in the form of an estimator module or processor 18 and a calculation and selection means in the for of a selector module or processor 20. Initially the continuous outputs 16 from the sensors are provided to the estimator module 18 whereas the discrete signals 17 are provided to the selector module 20.

Within a first stage of the estimator module 18, various ones of the sensor outputs 16 are used to derive a number of terrain indicators. In a first stage of the estimator module 18, a vehicle speed is derived from the wheel speed sensors, wheel acceleration is derived from the wheel speed sensors, the longitudinal force on the wheels is derived from the vehicle longitudinal acceleration sensor, and the torque at which wheel slip occurs (if wheel slip occurs) is derived from the motion sensors to detect yaw, pitch and roll. Other calculations performed within the first stage of the estimator module 18 include the wheel inertia torque (the torque associated with accelerating or decelerating the rotating wheels), "continuity of progress" (the assessment of whether the vehicle is starting and stopping, for example as may be the case when the vehicle is travelling over rocky terrain), aerodynamic drag, yaw rate, and lateral vehicle acceleration.

The estimator module 18 also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel 181 (based on the lateral acceleration and the output from the steering wheel sensor), the wheel longitudinal slip (based on the longitudinal force on the wheels, the wheel acceleration, SCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface).

The SCS activity signal is derived from several outputs from an SCS ECU (not shown), which contains the DSC (Dynamic Stability Control) function, the TC (Traction Control) function, ABS and HDC algorithms, indicating DSC activity, TC activity, ABS activity, brake interventions on individual wheels, and engine torque reduction requests from the SCS ECU to the engine. All these indicate a slip event has occurred and the SCS ECU has taken action to control it. The estimator module 18 also uses the outputs from the wheel speed sensors to determine a wheel speed variation and corrugation detection signal.

On the basis of the windscreen wiper signal (ON/OFF), the estimator module 18 also calculates how long the windscreen wipers have been in an ON state (i.e. a rain duration signal).

The VCU 10 also includes a road roughness module 24 for calculating the terrain roughness based on the air suspension sensors the ride height sensors) and the wheel accelerometers. A terrain indicator signal in the form of a roughness output signal 26 is output from the road roughness module 24.

The estimates for the wheel longitudinal slip and the lateral friction estimation are compared with one another within the estimator module 18 as a plausibility check.

Calculations for wheel speed variation and corrugation output, the surface rolling resistance estimation, the wheel longitudinal slip and the corrugation detection, together with the friction plausibility check, are output from the estimator module 18 and provide terrain indicator output signals 22, indicative of the nature of the terrain in which the vehicle is travelling, for further processing within the VCU 10.

The terrain indicator signals 22 from the estimator module 18 are provided to the selector module 20 for determining which of a plurality of vehicle subsystem control modes is most appropriate based on the indicators of the type of terrain in which the vehicle is travelling.

The most appropriate control mode is determined by analysing the probability that each of the different control modes is appropriate on the basis of the terrain indicator signals 22, 26 from the estimator module 18 and the road roughness module 24.

Figure 3:
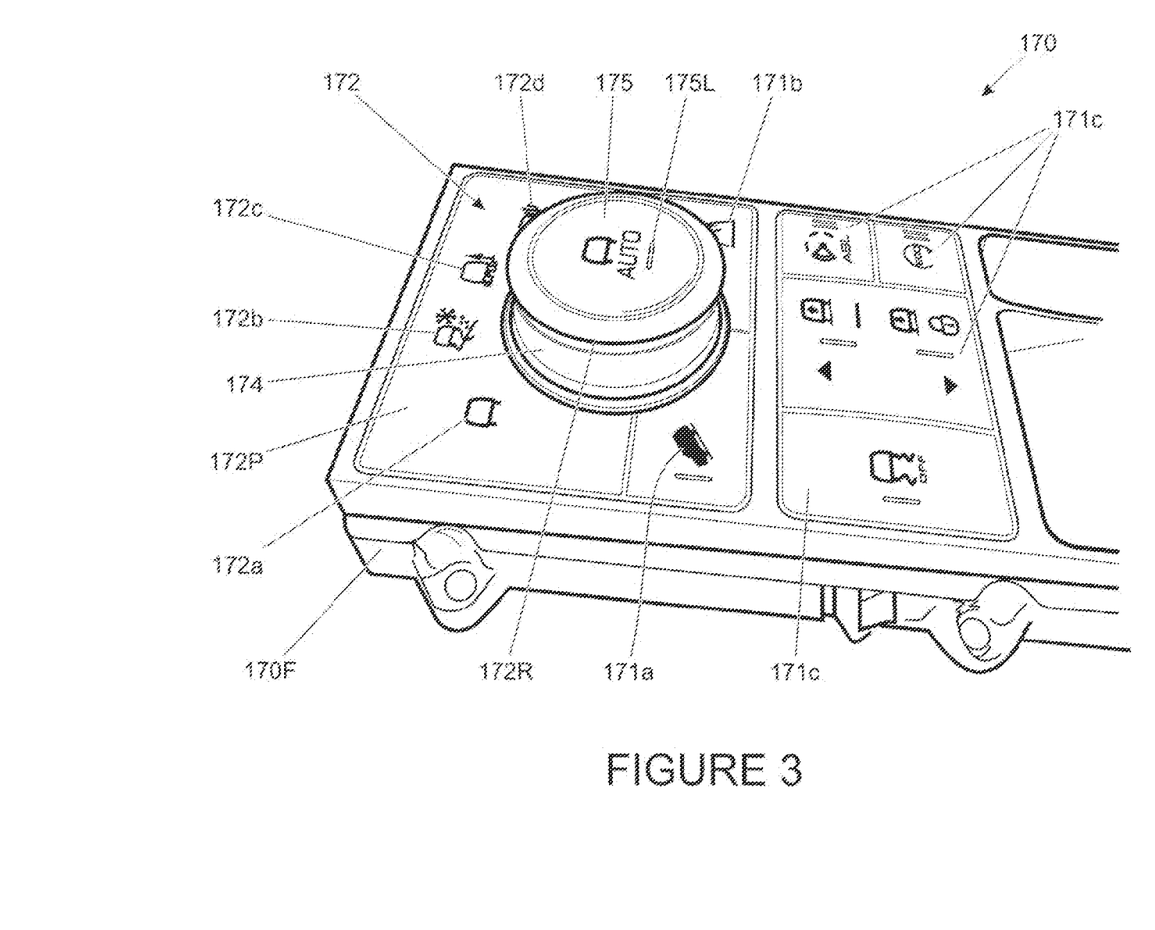
FIG. 3 is a schematic illustration of a switchpack according an embodiment of the invention with a rotary knob in a deployed condition.

The vehicle subsystems 12 may be controlled automatically in a given subsystem control mode (in an "automatic mode" or "automatic condition" of operation of the VCU 10) in response to a control output signal 30 from the selector module 20 and without the need for driver input. Alternatively, the vehicle subsystems 12 may be operated in a given subsystem control mode according to a manual user input (in a "manual mode" or "manual condition" of operation of the VCU 10) via a Human Machine Interface (HMI) module 32. Thus the user determines in which subsystem control mode the subsystems will be operated. The HMI module 32 comprises a display screen not shown) and a user operable switchpack 170 (FIG. 3). The user may select between the manual and automatic modes (or conditions) of operation of the VCU 10 via the switchpack 170. When the VCU 10 is operating in the manual mode or condition, the switchpack 170 also allows the user to select the desired subsystem control mode.

It is to be understood that the subsystem controller 14 may itself control the vehicle subsystems 12a-12e directly via the signal line 13, or alternatively each subsystem may be provided with its own associated intermediate controller (not shown in FIG. 1) for providing control of the relevant subsystem 12a-12e. In the latter case the subsystem controller 14 may only control the selection of the most appropriate subsystem control mode for the subsystems 12a-12e, rather than implementing the actual control steps for the subsystems. The or each intermediate controller may in practice form an integral part of the main subsystem controller 14.

When operating in the automatic mode, the selection of the most appropriate subsystem control mode is achieved by means of a three phase process:
(1) for each type of control mode, a calculation is performed of the probability that the control mode is suitable for the terrain over which the vehicle is travelling, based on the terrain indicators;
(2) the integration of "positive differences" between the probability for the current control mode and the other control modes; and
(3) the program request to the control module 14 when the integration value exceeds a predetermined threshold or the current terrain control mode probability is zero.

The specific steps for phases (1), (2) and (3) will now be described in more detail.

In phase (1), the continuous terrain indicator signals in the form of the road surface roughness output 26 and the outputs 22 from the estimator module 18 are provided to the selector module 20. The selector module 20 also receives the discrete terrain indicators 17 directly from various sensors on the vehicle, including the transfer box status signal (whether the gear ratio is set to a HI range or a LO range), the DSC status signal, cruise control status (whether the vehicle's cruise control system is ON or OFF), and trailer connect status (whether or not a trailer is connected to the vehicle). Terrain indicator signals indicative of ambient temperature and atmospheric pressure are also provided to the selector module 20.

The selector module 20 is provided with a probability algorithm 20a for calculating the most suitable control mode for the vehicle subsystems based on the discrete terrain indicator signals 17 received directly from the sensors and the continuous terrain indicators 22, 26 calculated by the estimator module 18 and the road surface roughness module 24, respectively.

The control modes typically include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SO OFF mode or SPO mode) which is a suitable compromise mode, or general purpose mode, for all terrain conditions and especially vehicle travel on motorways and regular roadways. Many other control modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

For each subsystem control mode, the algorithm 20a within the selector module 20 performs probability calculation, based on the terrain indicators, to determine a probability that each of the different control modes is appropriate. The selector module 20 includes a tuneable data map which relates the continuous terrain indicators 22, 26 (e.g. vehicle speed, road roughness, steering angle) to a probability that a particular control mode is appropriate. Each probability value typically takes a value of between 0 and 1. So, for example, the vehicle speed calculation may return a probability of 0.7 for the RB mode if the vehicle speed is relatively slow, whereas if the vehicle speed is relatively high the probability for the RB mode will be much lower (e.g. 0.2). This is because it is much less likely that a high vehicle speed is indicative that the vehicle is travelling over a rock or boulder terrain.

In addition, for each subsystem control mode, each of the discrete terrain indicators 17 (e.g. trader connection status ON/OFF, cruise control status ON/OFF) is also used to calculate an associated probability for each of the control modes, GGS, RB, Sand, MR or SP OFF. So, for example, if cruise control is switched on by the driver of the vehicle, the probability that the SP OFF mode is appropriate is relatively high, whereas the probability that the MR control mode is appropriate will be lower.

For each of the different sub system control modes, a combined probability value, Pb, is calculated based on the individual probabilities for that control mode, as described above, as derived from each of the continuous or discrete terrain indicators 17, 22, 26. In the following equation, for each control mode the individual probability as determined or each terrain indicator is represented by a, b, c, d, . . . n. The combined probability value, Pb, for each control mode is then calculated as follows:

$$Pb=(a.b.c.d \ldots n)/((a.b.c.d \ldots n)+(1-a).(1-b).(1-d) \ldots (1-n))$$

Any number of individuai probabilities may be input to the probability algorithm 20a and any one probability value input to the probability algorithm may itself be the output of a combinational probability function.

Once the combined probability value for each control mode has been calculated, the subsystem control program corresponding to the control mode with the highest probability is selected within the selector module 20 and an output signal 30 providing an indication of this is provided to the subsystem control module 14. The benefit of using a combined probability function based on multiple terrain indicators is that certain indicators may make a control mode (e.g. GGS or MR) more or less likely when combined together, compared with basing the selection on just a single terrain indicator alone.

A further control signal 31 from the selector module 20 is provided to a control module 34.

In phase (2), an integration process is implemented continually within the selector module 20 to determine whether it is necessary to change from the current control mode to one of the alternative control modes.

The first step of the integration process is to determine whether there is a positive difference between the combined probability value for each of the alternative control modes compared with the combined probability value for the current control mode.

By way of example, assume the current control mode is GGS with a combined probability value of 0.5. If a combined probability value for the sand control mode is 0.7, a positive difference is calculated between the two probabilities (i.e. a positive difference value of 0.2). The positive difference value is integrated with respect to time. If the difference remains positive and the integrated value reaches a predetermined change threshold (referred to as the change threshold), or one of a plurality of predetermined change thresholds, the selector module 20 determines that the current terrain control mode (for GGS) is to be updated to a new, alternative control mode (in this example, the sand control mode). A control output signal 30 is then output from the selector module 20 to the subsystem control module 14 to initiate the sand control mode for the vehicle subsystems.

In phase (3), the probability difference is monitored and if, at any point during the integration process, the probability difference changes from a positive value to a negative value, the integration process is cancelled and reset to zero. Similarly, if the integrated value for one of the other alternative control modes (i.e. other than sand), reaches the predetermined change threshold before the probably result for the sand control mode, the integration process for the sand control mode is cancelled and reset to zero and the other alternative control mode, with a higher probability difference, is selected.

Switchpack

As described above, the vehicle 100 has an HMI module 32 comprising a user operable switchpack 170 shown schematically in FIG. 3. The switchpack 170 allows a user to toggle the VCU 10 between the automatic and manual conditions of operation.

Figure 4:
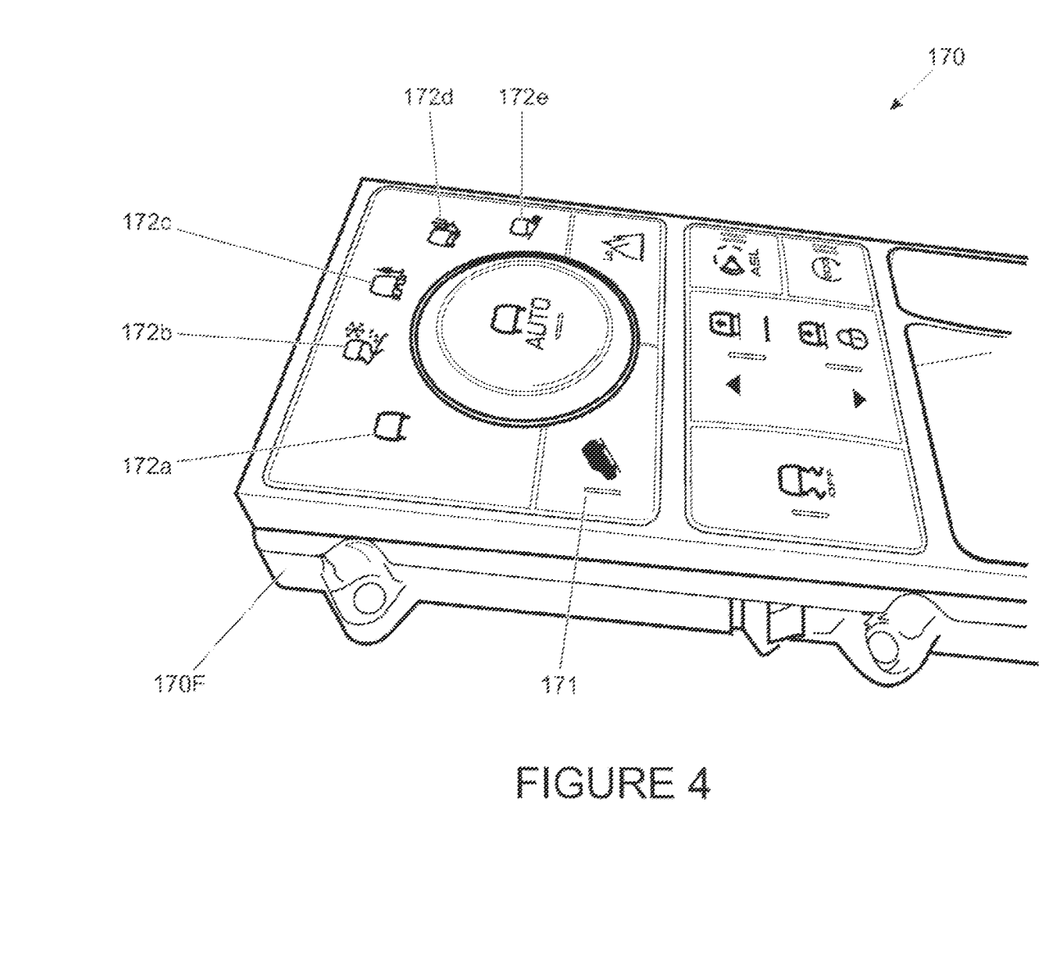
FIG. 4 is a schematic illustration of a switchpack according to an embodiment of the invention with a rotary knob in a retracted condition.

The switchpack 170 has a frame 170F supporting switchgear associated with the switchpack 170. The switchpack 170 has a rotary knob 172 connected to a multistable rotary switch (not shown). The knob 172 may be moved between an exposed or deployed position as shown in FIG. 3 and a retracted position as shown in FIG. 4. In the exposed position the knob 172 stands proud of a panel 172P which surrounds the knob 172. Icons 172a-e are marked in the panel at circumferentially spaced apart locations around the knob 172 over an arc of around 140° in the embodiment shown although other angles and other numbers of modes are also useful. The icons 172a-e may be illuminated selectively in order to indicate the identity of the control mode in which the subsystems 12 are being operated.

Other switches 171a, b are also provided in a remaining portion of the panel 172P allowing a driver to activate a hill descent control (HDC) function, via switch 171a, and select a required gear ratio of the PTU 137 ('high' or 'low'), via switch 171b.

Further Switches 171c of the switchpack enable the SCS system of the vehicle to be activated or deactivated, a ride height to be adjusted, an eco mode to be selected and an automatic speed limiter (ASL) function to be selected.

The rotary knob 172 has a substantially cylindrical column portion 174 with its cylinder axis oriented substantially orthogonally relative to the panel 172P. The knob 172 has an upper panel 175 bearing the word 'AUTO'. When the knob 172 is in the retracted position an indicator lamp 175L of the panel 175 illuminates, indicating that the VCU 10 has assumed the automatic condition in which the VCU 10 selects automatically an appropriate subsystem control mode.

When the knob 172 is in the exposed position the indicator amp 175L is extinguished, indicating that the VCU 10 has assumed the manual condition. The knob 172 is moved between the exposed and retracted positions by means of a spring mechanism triggered by pressing on the panel 175. Other arrangements are also useful such as an electrical servo. In some embodiments a switch is integrated into the knob 172 such that pressing on the panel 175 alone actuates the switch to switch between the automatic and manual conditions. In some embodiments the switch is positioned such that sufficient axial pressure applied to substantially any exposed portion of the knob 172 including rim 172R results in actuation of the switch. The knob 172 may be configured to exercise a relatively small axial translation when the switch is actuated, providing tactile feedback to the user, followed by a relatively large axial translation as the knob 172 moves between the exposed and retracted positions or vice versa.

The knob 172 is configured such that the rim 172R may be grasped by the user and rotated about a cylinder axis of the column portion 174. The switchback 170 is arranged such that the VCU 10 may determine in which direction the user turns the rim 172R based on a signal output by the switchpack 170. In an example rim 172R is provided with a knurled peripheral surface arranged to facilitate the user grasping the knob 172 with their fingers.

Rotation of the rim 172R is indexed in discrete angular increments of around 10-20° by means of a detent mechanism. This allows tactile feedback to be provided to a user confirming when the knob 172 has been rotated through one of the discrete angular increments. Other angles and other arrangements are also useful. The rim 172R may be rotated by any number of turns in either direction without constraint by the switchpack 170.

In some embodiments, when the VCU 10 is in the manual condition, rotation of the rim 172R by two increments in a clockwise (or anticlockwise) direction causes the VCU 10 to assume the mode corresponding to the icon 172a-e that is located adjacent the icon corresponding to the currently selected mode in a clockwise (or anticlockwise) direction. If no such icon exists then the VCU 10 takes no action and the currently selected mode remains selected. If the user rotates the knob 172R by only a single increment in a given direction, with no further increment in that direction within a prescribed time period (such as is or any other suitable period), no change in control mode takes place. This feature reduces a risk that a user unintentionally changes the selected mode. It is to be understood that any prescribed number of incremental turns may be required in order to enable a mode change to take place. Furthermore, any prescribed time period may be set within which the prescribed number of increments (or in addition or instead any two consecutive increments) are to take place.

In some embodiments, a user is required to rotate the rim 172R by only a single increment in order to signal a requirement to change mode.

In some embodiments, in addition to or instead of rotating the rim 172R of the knob 172 in order to change control mode when the VCU 10 is in the manual condition, the knob 172 may be configured such that mode changes may be effected by rotation of column 174. In some embodiments the rim 172R may be rotatable whilst the column 174 remains stationary, whilst in some alternative embodiments the rim 172P, and column 174 may be arranged to rotate together. They may for example be fixedly coupled or integrally formed in some embodiments.

In some embodiments, the VCU 10 may be configured to allow manual selection of a given control mode following user selection of that mode only once it has determined that the user has finished rotating the rim 172R. The VCU 10 may wait a prescribed period of time after the last incremental rotation has been detected, for example up to around 2 s, before allowing a mode change to take place. In some embodiments the VCU 10 may be arranged to effect a mode change a predetermined time after it has been determined that the user has released their grip from the knob 172.

In some embodiments the VCU 10 may be arranged to verify that one or more prescribed vehicle settings or parameters are appropriate to the mode the user wishes to select before allowing a mode change. For example, the VCU 10 may check one or more selected from amongst selected PTU gear ratio, selected ride height and/or one more other settings. If the settings are not appropriate to the mode the user wishes to select, the VCU 10 may be configured to remain in the current control mode until the settings are determined to be appropriate. In the meantime the VCU 10 may cause the icon of the currently selected mode to remain illuminated. The icon corresponding to that of the mode the user wishes the VCU 10 to assume may be arranged to illuminate intermittently in some embodiments, e.g. by flashing. The user may be informed of the one or more deficiencies in settings identified by the VCU 10. If they are not remedied within a prescribed period of time, or in some embodiments if an attempt to remedy them is not commenced within a prescribed period, the VCU 10 may be configured to operate as if the user had not sought to change mode. That is, information in respect of deficiencies is not displayed any longer, and flashing of the icon corresponding to the proposed mode is terminated.

It is to be understood that when a user activates the automatic condition of the VCU 10 the VCU 10 controls the vehicle subsystems to operate in the most appropriate control mode as determined by the VCU 10. The rotary knob 172 assumes the retracted position and any rotation of the rim 172R by a user does not cause a change in the selected control mode. Rather, it is ignored by the VCU 10.

If whilst the VCU 10 is in the automatic condition the manual condition is activated, the VCU 10 controls the vehicle subsystems automatically to assume the SPO mode, being the mode intended to provide the best compromise in vehicle subsystem adjustment/set-up for normal road and light off-road use. The knob 172 also assumes the exposed position. Icon 172a, which corresponds to the SPO mode, is illuminated.

If a user wishes to select a mode other than the SPO mode, he or she may grasp the rim 172R and rotate the rim 172R in a clockwise direction to select the appropriate mode. If the rim 172R is rotated by two indexed angular increments and the user waits for 2 s, the VCU 10 assumes the GGS mode. Icon 172a is no longer illuminated and icon 172b becomes illuminated, if the rim 172R is rotated by two further angular increments, the vehicle will assume MR mode, icon 172b will no longer be illuminated and icon 172c will be illuminated instead, and so forth. As noted above the number of angular increments may be any suitable number such as 1, 3 or any other suitable number.

This it is to be understood that the angular position of the rim 172R when the automatic condition was last selected is irrelevant to the determination of the control mode the VCU 10 will assume when the manual condition is subsequently selected. Regardless of the control mode that was selected when the knob 172 was last retracted, when the knob 172 is subsequently exposed VCU 10 selects the SPO control mode. Because the rim 172R is freely rotatable without constraint (due to the absence of features constraining rotation such as an end stop to prevent further rotation in a given direction) the actual (absolute) angular position of the rim 172R is irrelevant, it is to be understood that if this feature were not employed and the rim 172R were required to be in a prescribed absolute rotational position in order to select SPO mode, additional (automatic) actuation of the rim 172R by the switchpack 170 would be required when transitioning from the automatic to manual conditions of the VCU 10. For example, if the rim 172R had been set to select RB mode prior to the user selecting the automatic condition of the VCU 10, the switchpack 170 would be required to rotate the rim 172R from the position corresponding to the RB mode to that corresponding to the SPO mode when manual mode were subsequently selected. Additional, potentially complicated failsafe countermeasures would be required.

It is to be understood that in some alternative embodiments, when the automatic condition is deselected and the manual condition is assumed, the VCU 10 may be arranged to remain in the driving mode that was selected automatically by the VCU 10 when in the automatic condition until the user selects a different driving mode by rotation of the rim 172R. Thus, when the manual condition is selected, the icon 172a-e corresponding to the currently (automatically) selected driving mode remains illuminated. If the VCU 10 is configured such that none of icons 172a-e are illuminated when the VCU 10 is in the automatic condition then the icon corresponding to the currently selected driving mode is illuminated when the manual condition is assumed.

It is to be understood that other arrangements are also useful.

It is to be understood that in some embodiments the VCU 10 is configured wherein at key-on (when a driver starts the vehicle 100) the VCU 10 assumes the operating condition (automatic or manual) that was selected when key-off last occurred (i.e. when the driver stopped the vehicle). In some embodiments, at key-off the rotary knob 172 may remain in the same (exposed or retracted) position such that prior to key-on a user may determine readily in which condition the VCU 10 will operate following the key-on operation.

it is to be understood that at key-on, if the VCU 10 continues operating in the automatic condition, the VCU 10 is configured to assume the SPO mode although other arrangements are useful.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

This application claims priority from UK patent application no. GB1215954.7 and the entire contents of this document, as well as the contents of co-pending UK patent applications numbers GB1111288.5, GB1211910.3 and GB1202427.9, are expressly incorporated herein by reference.

The invention claimed is:

1. A motor vehicle control system for controlling a plurality of vehicle subsystems to operate in a plurality of subsystem configuration modes in dependence on a selected driving surface, the motor vehicle control system comprising:
   a controller having at least one processor wherein the controller is operable in a manual operating mode in which a user is able to select said driving surface and an automatic operating mode in which the controller is operable to select said driving surface automatically;
   wherein the controller is able to be switched between said manual and automatic operating modes by means of a user-operable input device; and
   wherein when operating in the automatic operating mode and a change from the automatic operating mode to the manual operating mode is made via the user-operable input device, the controller is configured to select a default subsystem configuration mode.

2. The motor vehicle control system according to claim 1, wherein the default subsystem configuration mode comprises the subsystem configuration mode that was selected when the controller was last in the manual operating mode.

3. The motor vehicle control system according to claim 1, wherein the default subsystem configuration mode comprises a general purpose driving surface/subsystem configuration mode.

4. The motor vehicle control system according to claim 1, wherein the default subsystem configuration mode is independent of the subsystem configuration mode that was selected in the automatic mode.

5. The motor vehicle control system according to claim 1, wherein the default subsystem configuration mode is independent of the subsystem configuration mode that was selected when the controller was last in the manual operating mode.

6. The motor vehicle control system according to claim 1, wherein the default subsystem configuration mode is independent of a position of the user-operable input device when the controller was last in the manual operating mode.

7. A control device for a vehicle control system, the vehicle control system being arranged to control a plurality of vehicle subsystems to operate in a plurality of subsystem configuration modes in dependence on a selected driving surface, the vehicle control system being operable in a manual operating mode in which a user is able to select said driving surface and an automatic operating mode in which the vehicle control system is operable to select said driving surface automatically, wherein the control device comprises:
   a manual operating mode position and an automatic operating mode position, and wherein the control device is configured to be displaced between the manual operating mode position in which the control device can be manipulated by the user to select said driving surface and the automatic operating mode position in which the user is prevented from manipulating the control device to select said driving surface.

8. The control device as claimed in claim 7 configured to be displaced axially between the manual operating mode position and the automatic operating mode position.

9. The control device as claimed in claim 7 wherein in the automatic operating mode position the control device is partially or fully recessed into a trim panel or housing at least partially surrounding the control device.

10. The control device as claimed in claim 7 wherein in the automatic operating mode position, pressing the control device causes the control device to move axially to the manual operating mode position in which the control device protrudes from the trim panel or housing.

11. A control device for a vehicle control system, the vehicle control system being arranged to control a plurality of vehicle subsystems to operate in a plurality of subsystem configuration modes in dependence on a selected driving surface, the vehicle control system being operable in a manual operating mode in which a user is able to select said driving surface and an automatic operating mode in which the vehicle control system is operable to select said driving surface automatically, wherein the control device comprises:
   a user operable input device configured to be rotated by the user in the manual operating mode thereby to select said driving surface and to be displaced axially by the user to switch between the manual operating mode and the automatic operating mode.

12. The control device as claimed in claim 11 wherein in the manual operating mode of the vehicle control system, clockwise rotation of the user operable input device causes selection of said driving surface in a first sequential order and anticlockwise rotation of the user operable input device causes selection of said driving surface in the reverse sequential order.

13. The control device as claimed in claim 12 wherein in the manual operating mode of the vehicle control system, when the user operable input device has been rotated in a first direction so as to select the last driving surface in the corresponding sequence, further rotation of the device in said first direction maintains the selected driving surface and does not cause selection of a different driving surface.

14. The control device as claimed in claim 11 wherein following selection of the automatic operating mode from the manual operating mode, subsequent selection of the manual operating mode causes selection of a default subsystem configuration mode that is independent of at least one of the rotational position of the user operable input device or the previously selected subsystem configuration mode.

15. The control device as claimed in claim 11 wherein when the vehicle control system is in the manual operating mode, a mechanical stop prevents rotation of the user operable input device past the last driving surface in the sequence.

16. The control device as claimed in claim 15 configured automatically to control the user operable input device to select the default subsystem configuration mode when switching from automatic operating mode to manual operating mode.

17. A vehicle comprising:
    a motor vehicle control system for controlling a plurality of vehicle subsystems to operate in a plurality of subsystem configuration modes in dependence on a selected driving surface, the motor vehicle control system comprising:
    a controller having at least one processor wherein the controller is operable in a manual operating mode in which a user is able to select sais driving surface and an automatic operating mode in which the controller is operable to select said driving surface automatically;
    wherein the controller is able to be switched between said manual and automatic operating modes by means of a user-operable input device; and
    wherein when operating in the automatic operating mode and a change from the automatic operating mode to the manual operating mode is made via the user-operable input device, the controller is configured to select a default subsystem configuration mode.

18. A method of controlling a motor vehicle system, comprising:
    controlling a plurality of vehicle subsystems to operate in a plurality of subsystem configuration modes in dependence on a selected driving surface, in a manual operating mode the method comprising allowing a user to select said driving surface and in an automatic operating mode the method comprising selecting said driving surface automatically;
    switching between said manual and automatic operating modes in response to reception of a user input by means of a user-operable input device; and
    selecting a default subsystem configuration mode when operating in the automatic operating mode and a change from the automatic operating mode to the manual operating mode is requested via the user-operable input device.

19. A vehicle comprising:
    a control device for a vehicle control system arranged to control a plurality of vehicle subsystems to operate in a plurality of subsystem configuration modes in dependence on a selected driving surface, the vehicle control system being operable in a manual operating mode in which a user is able to select said driving surface and an automatic operating mode in which the vehicle control system is operable to select said driving surface automatically, wherein the control device comprises:
    a user operable input device configured to be rotated by the user in the manual operating mode thereby to select said driving surface and to be displaced axially by the user to switch between the manual operating mode and the automatic operating mode.

20. A vehicle, comprising:
    a vehicle control system arranged to control a plurality of vehicle subsystems to operate in a plurality of subsystem configuration modes in dependence on a selected driving surface, and the vehicle control system being operable in a manual operating mode in which a user is able to select said driving surface and an automatic operating mode in which the vehicle control system is operable to select said driving surface automatically; and
    a control device for the vehicle control system comprising a manual operating mode position and an automatic operating mode position and configured to be displaced between the manual operating mode position in which the control device can be manipulated by the user to select said driving surface and the automatic operating mode position in which the user is prevented from manipulating the control device to select said driving surface.

* * * * *